(12) United States Patent
Snider et al.

(10) Patent No.: US 10,668,868 B2
(45) Date of Patent: Jun. 2, 2020

(54) SLIDER WINDOW ASSEMBLY WITH INTEGRATED CAMERA

(71) Applicant: MAGNA MIRRORS OF AMERICA, INC., Holland, MI (US)

(72) Inventors: Darin J. Snider, Holland, MI (US); David L. Guillozet, Hamilton, MI (US); R. Scott Repp, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 9 days.

(21) Appl. No.: 15/937,159

(22) Filed: Mar. 27, 2018

(65) Prior Publication Data

US 2018/0281697 A1 Oct. 4, 2018

Related U.S. Application Data

(60) Provisional application No. 62/477,574, filed on Mar. 28, 2017.

(51) Int. Cl.
| | |
|---|---|
| *B60R 11/04* | (2006.01) |
| *B60Q 1/44* | (2006.01) |
| *B60J 1/00* | (2006.01) |
| *H04N 7/18* | (2006.01) |
| *B60J 1/18* | (2006.01) |
| *B60Q 3/30* | (2017.01) |
| *B60Q 1/30* | (2006.01) |
| *B60Q 3/74* | (2017.01) |

(Continued)

(52) U.S. Cl.
CPC ............... *B60R 11/04* (2013.01); *B60J 1/003* (2013.01); *B60J 1/18* (2013.01); *B60J 1/1853* (2013.01); *B60Q 1/302* (2013.01); *B60Q 1/44* (2013.01); *B60Q 3/30* (2017.02); *H04N 7/183* (2013.01); *H04N 7/185* (2013.01); *H04N 7/188* (2013.01); *B60Q 3/74* (2017.02); *B60R 2011/004* (2013.01); *B60R 2011/0026* (2013.01); *E05D 15/0686* (2013.01); *E05D 15/08* (2013.01); *E05Y 2400/852* (2013.01); *E05Y 2900/55* (2013.01)

(58) Field of Classification Search
CPC ............. B60R 11/04; B60R 2011/0026; B60R 2011/004; B60Q 3/30; B60Q 1/302; B60Q 1/44; B60Q 3/74; B60J 1/1853; B60J 1/18; B60J 1/003; H04N 7/183; H04N 7/188; H04N 7/185; E05D 15/08; E05D 15/0686; E05Y 2400/852; E05Y 2900/55
USPC ....................................................... 296/146.6
See application file for complete search history.

(56) References Cited

U.S. PATENT DOCUMENTS

| | | |
|---|---|---|
| 4,920,698 A | 5/1990 | Friese et al. |
| 4,995,195 A | 2/1991 | Olberding et al. |

(Continued)

*Primary Examiner* — Pinel E Romain
(74) *Attorney, Agent, or Firm* — Honigman LLP

(57) ABSTRACT

A slider window assembly for a vehicle includes a frame portion having an upper rail and a lower rail fixedly attached to at least one fixed window panel, with the at least one fixed window panel defining an opening. A movable window panel is movable along the upper rail and the lower rail between a closed position, where the movable window panel is disposed at the opening, and an opened position, where the movable window panel is disposed at least partially along the at least one fixed window panel. A camera is mounted at an inner surface of the at least one fixed window panel and captures image data representative of the scene rearward of the slider window assembly.

20 Claims, 12 Drawing Sheets

(51) Int. Cl.
  *B60R 11/00* (2006.01)
  *E05D 15/06* (2006.01)
  *E05D 15/08* (2006.01)

(56) References Cited

U.S. PATENT DOCUMENTS

| | | |
|---|---|---|
| 5,146,712 A | 9/1992 | Hlavaty |
| 5,531,046 A | 7/1996 | Kollar et al. |
| 5,572,376 A | 11/1996 | Pace |
| 5,799,444 A | 9/1998 | Freimark et al. |
| 5,839,231 A | 11/1998 | Gebhart et al. |
| 5,996,284 A | 12/1999 | Freimark et al. |
| 6,026,611 A | 2/2000 | Ralston et al. |
| 6,119,401 A | 9/2000 | Lin et al. |
| 6,691,464 B2 | 2/2004 | Nestell et al. |
| 6,955,009 B2 | 10/2005 | Rasmussen |
| 7,003,916 B2 | 2/2006 | Nestell et al. |
| 7,073,293 B2 | 7/2006 | Galer |
| RE41,502 E | 8/2010 | Neaux |
| 7,825,790 B2 * | 11/2010 | Tallinger ............... B60Q 1/2611 340/472 |
| 8,151,519 B2 | 4/2012 | Bello et al. |
| 8,402,695 B2 | 3/2013 | Smith et al. |
| 8,881,458 B2 | 11/2014 | Snider et al. |
| 8,915,018 B2 | 12/2014 | Snider |
| 8,938,914 B2 * | 1/2015 | Hulst .................... B60J 1/1853 49/127 |
| 9,834,066 B2 * | 12/2017 | Sudou .................... B60J 1/1853 |
| 2003/0213179 A1 | 11/2003 | Galer |
| 2004/0020131 A1 | 2/2004 | Galer et al. |
| 2006/0107600 A1 | 5/2006 | Nestell et al. |
| 2008/0127563 A1 | 6/2008 | Tooker |
| 2009/0212930 A1 * | 8/2009 | Pfeiffer .................. B60Q 9/008 340/435 |
| 2010/0149826 A1 | 6/2010 | Leese et al. |
| 2012/0236388 A1 * | 9/2012 | De Wind ................. B60R 1/04 359/267 |
| 2012/0314075 A1 * | 12/2012 | Cho ........................ B60R 1/00 348/148 |
| 2014/0047772 A1 | 2/2014 | Hulst |
| 2016/0059675 A1 * | 3/2016 | Snider .................... B60J 1/1853 49/70 |
| 2016/0200241 A1 * | 7/2016 | Snider .................... B60Q 1/268 296/146.16 |
| 2016/0355134 A1 * | 12/2016 | Leary ...................... B60R 11/04 |
| 2017/0028902 A1 * | 2/2017 | Diaz ......................... B60Q 1/22 |
| 2017/0259753 A1 * | 9/2017 | Meyhofer ................ B60R 1/06 |
| 2018/0227986 A1 * | 8/2018 | Snider ..................... H05B 3/86 |
| 2018/0326999 A1 * | 11/2018 | Hershkovitz ...... G06K 9/00335 |
| 2018/0361931 A1 * | 12/2018 | Ajisaka ................... B60R 11/04 |
| 2019/0210563 A1 * | 7/2019 | Slovesko ............... B60R 25/305 |

* cited by examiner

SLIDER WINDOW ASSEMBLY WITH INTEGRATED CAMERA

CROSS REFERENCE TO RELATED APPLICATION

The present application claims the filing benefits of U.S. provisional application Ser. No. 62/477,574, filed Mar. 28, 2017, which is hereby incorporated herein by reference in its entirety.

FIELD OF THE INVENTION

The present invention relates to a slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system, such as described in U.S. Pat. No. 8,151,519, which is hereby incorporated herein by reference in its entirety.

SUMMARY OF THE INVENTION

The present invention provides a rear slider window assembly that includes a camera disposed behind the fixed glass window panel (or appliqué) of the window assembly so as to provide a flush glass window assembly with a camera viewing through the fixed glass window panel (or through a hole formed in the fixed glass window or appliqué) rearward of the window assembly (such as rearward of the vehicle and/or downward into the pickup bed of the vehicle). The camera may be disposed in or integrated in a lighting module or assembly disposed at and integrated in the rear slider window assembly. The camera is electrically connected to a wiring harness or circuitry or user input or display system of the vehicle when the window assembly is installed or mounted at the vehicle.

These and other objects, advantages, purposes and features of the present invention will become apparent upon review of the following specification in conjunction with the drawings.

DESCRIPTION OF THE PREFERRED EMBODIMENTS

Figure 1:
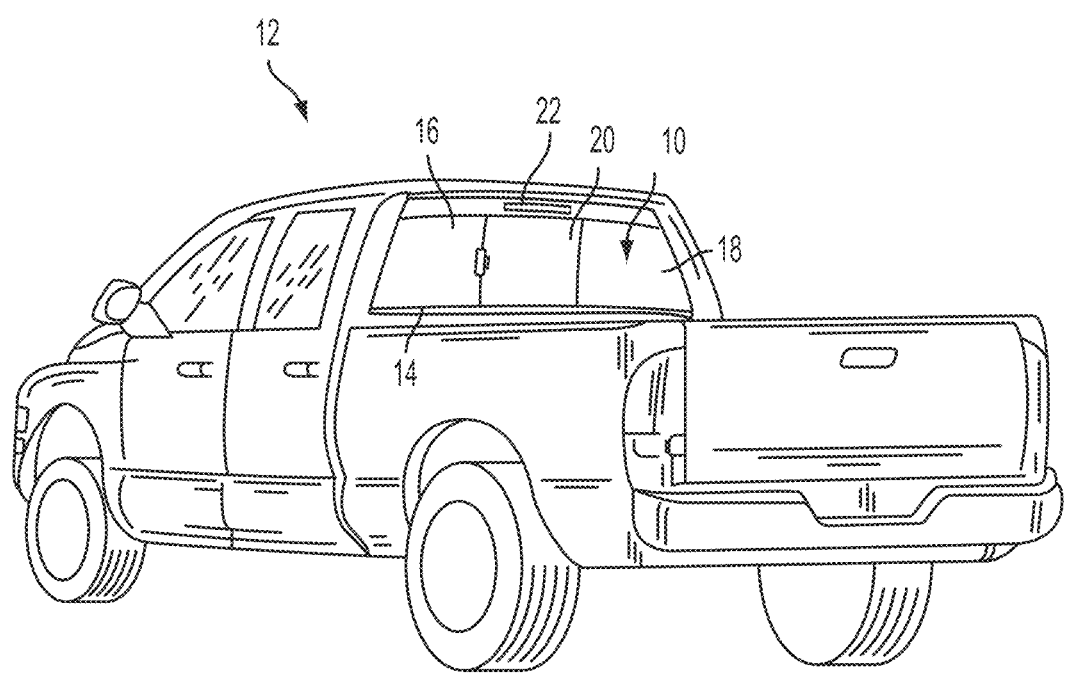
FIG. 1 is a rear perspective view of a pickup truck having a rear slider window assembly in accordance with the present invention.
Figure 2:
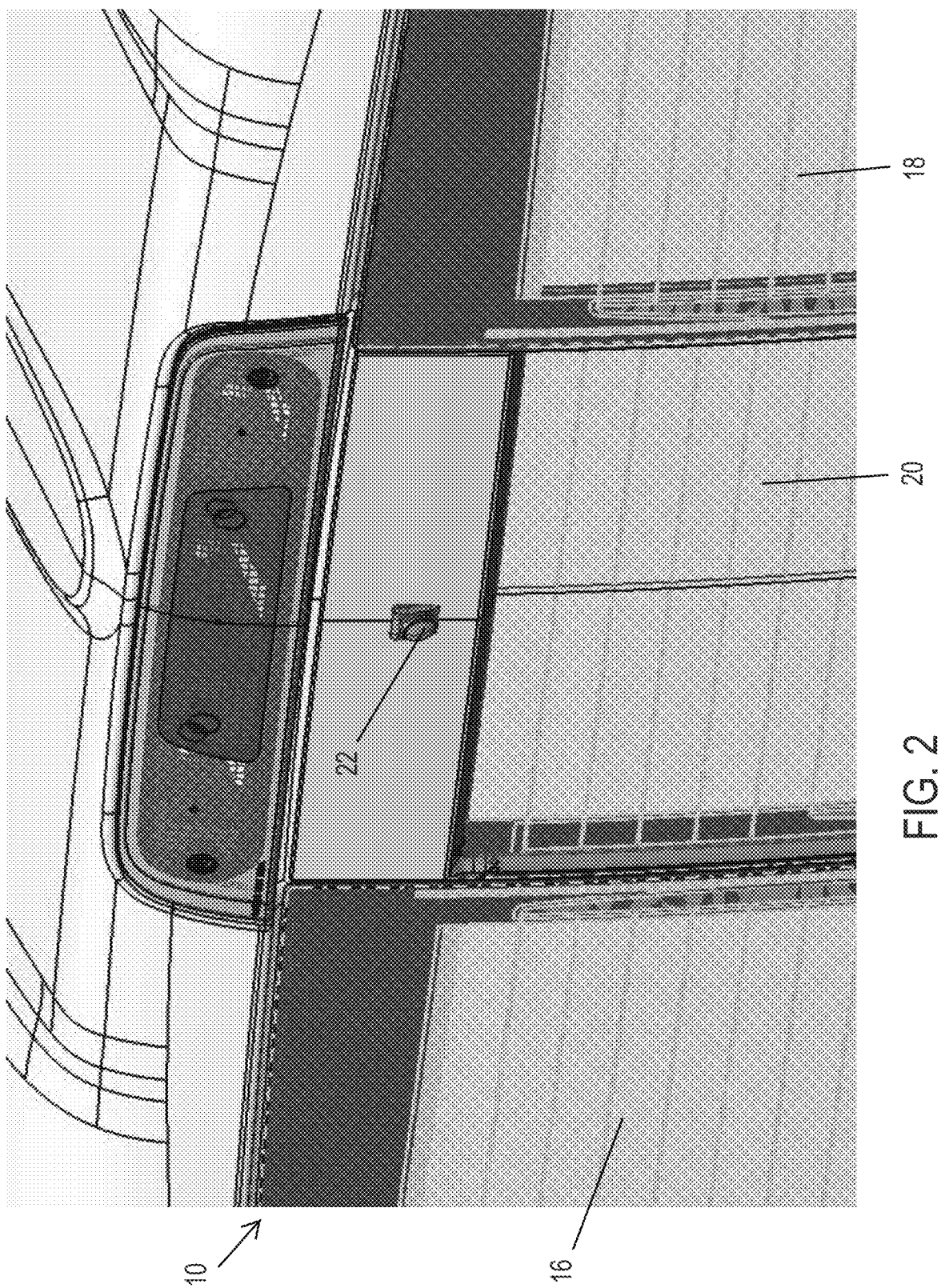
FIGS. 2 and 3 are rear perspective views of a camera disposed at an appliqué of the rear slider window assembly of the present invention.
Figure 3:
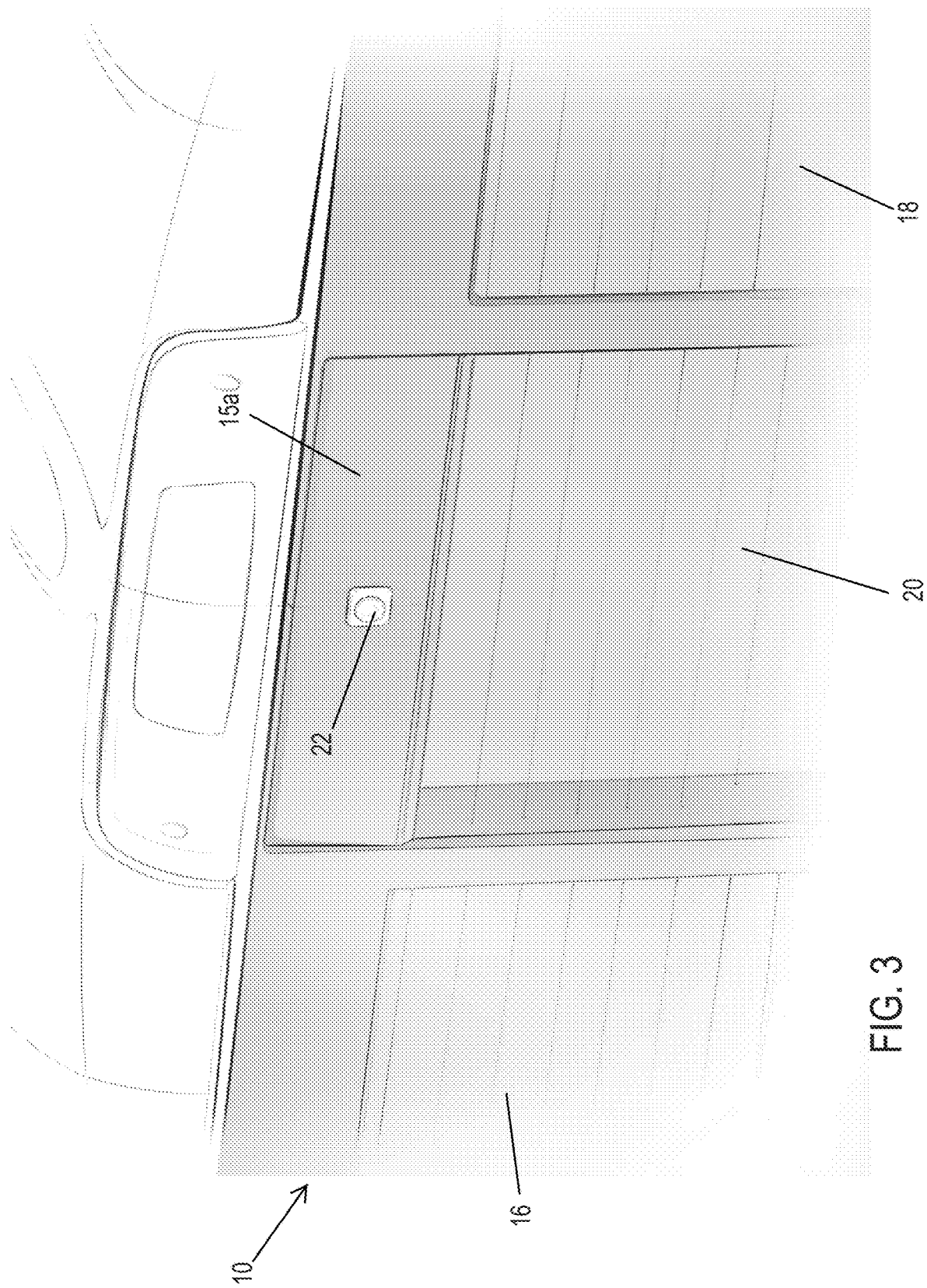

Referring now to the drawings and the illustrative embodiments depicted therein, a rear slider window assembly 10 of a vehicle 12 (such as a pickup truck or the like) includes a window frame 14, a fixed window panel 15 having an aperture that separates side window portions 16, 18 and a movable window panel 20 that is movable relative to frame 14 and fixed window panel between an opened position and a closed position (FIGS. 1-3). The window assembly 10 includes a camera or imaging device 22 disposed behind an upper appliqué 15a or behind the glass fixed window panel 15 and above and along a center region of an upper rail of the frame 14. The camera 22, when activated, captures image data representative of the scene rearward of the window assembly and/or vehicle. The camera may be disposed entirely behind the fixed glass window panel 15 (or behind an upper appliqué of the window assembly) so as to view through the glass window panel, or the camera may be disposed at a small aperture through the window panel (or through an upper appliqué) so as to not view through the glass. The camera is electrically connected to a wire harness of the vehicle, such that image data captured by the camera is communicated to a control unit, where the image data may be processed by an image processor (such as for object detection or the like) or such that images derived from image data captured by the camera may be displayed at a video display screen that is in the vehicle and viewable by a driver of the vehicle.

Figure 4:
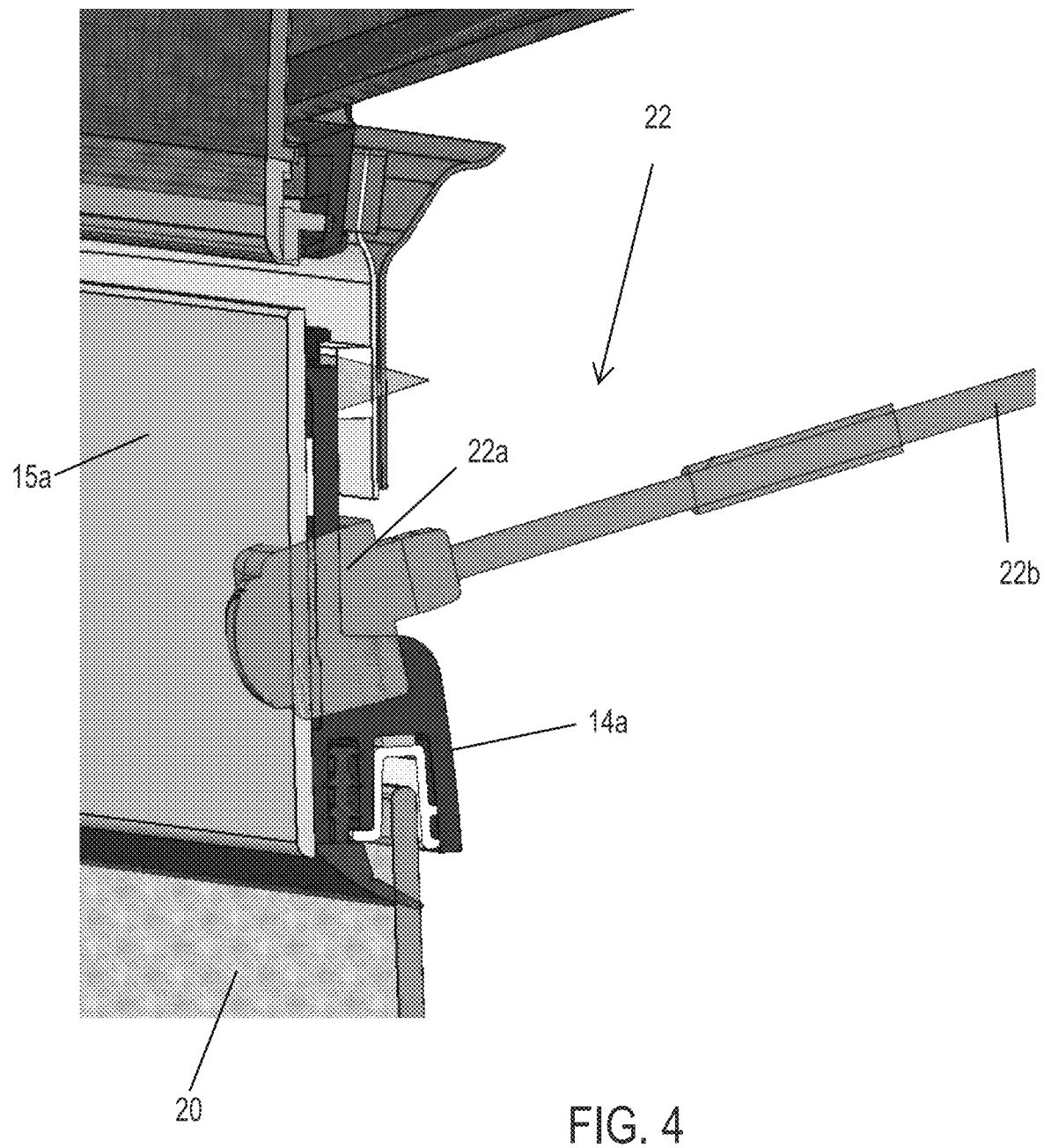
FIG. 4 is an enlarged perspective and partial sectional view of the camera and window assembly of FIGS. 2 and 3.
Figure 5:
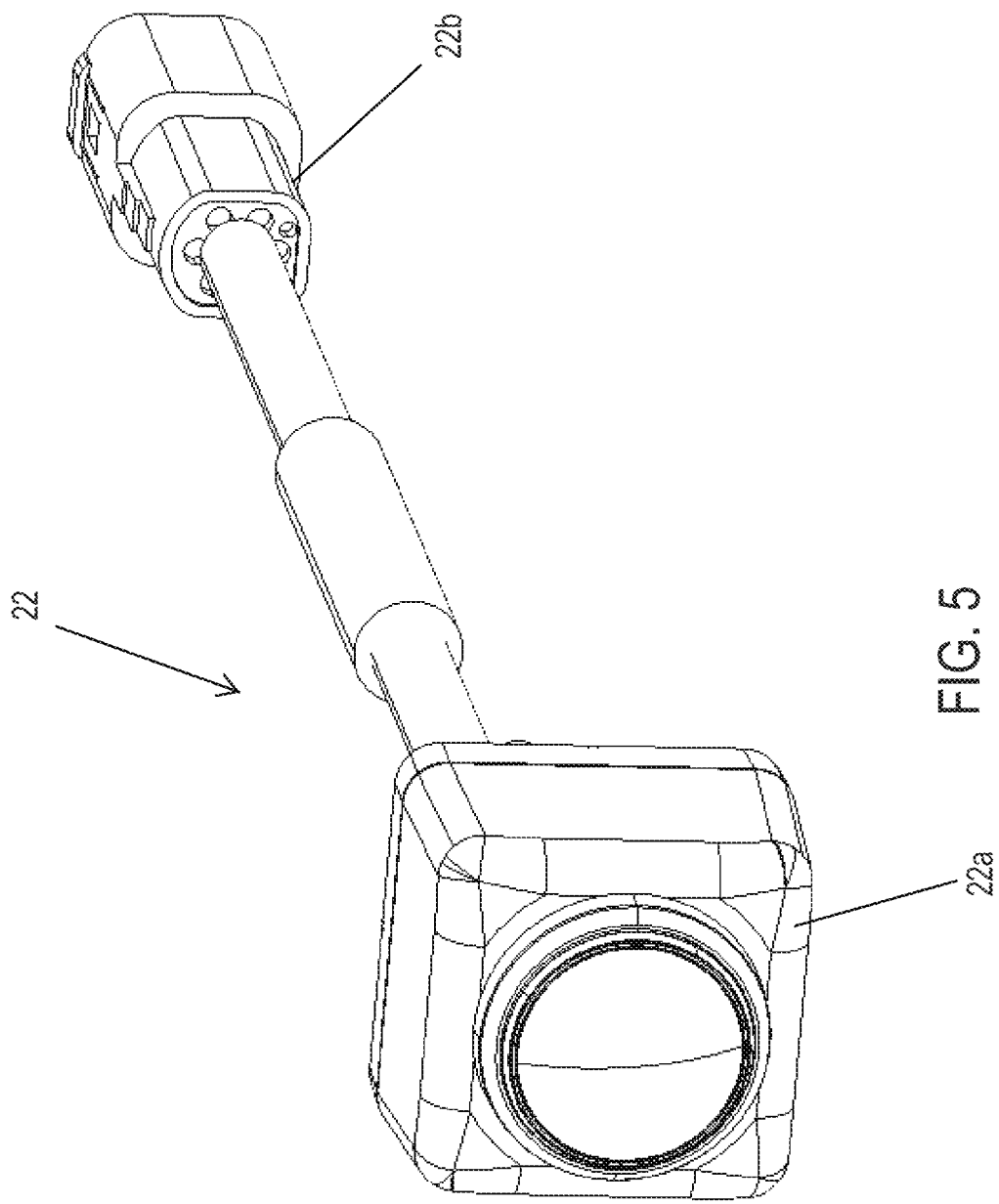
FIG. 5 is an enlarged perspective view of the camera of FIG. 4.
Figure 6:
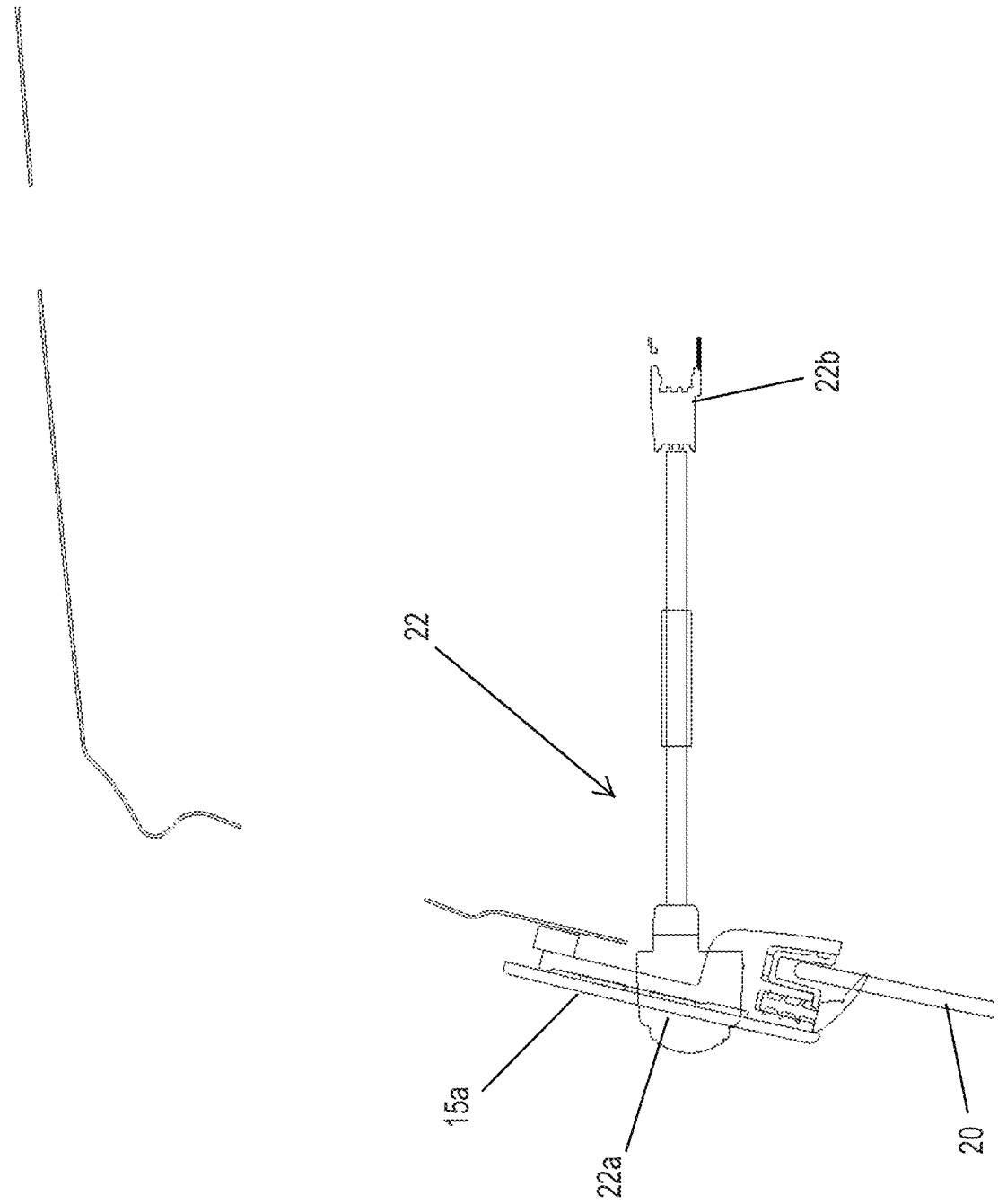
FIG. 6 is a sectional view of the camera and window assembly of FIGS. 2 and 3.

In the illustrated embodiment of FIGS. 2-6, the camera 22 includes a camera housing 22a (that houses or includes a lens and an imager and circuitry) and an electrical lead or connector 22b for electrically connecting the camera to a wire harness of the vehicle (such as via a multi-pin plug and socket type connection) when the window assembly is installed at the vehicle. As shown in FIGS. 2-4 and 6, the camera housing is disposed at an aperture through the upper appliqué 15a and is retained there, such that the camera lens is exposed exterior of the window assembly so as to not view through the glass or plastic fixed window panel or appliqué. The camera housing and the aperture through the appliqué 15a cooperate to retain the camera at the window assembly, such as via press fit and/or fasteners and/or adhesive or the like. As can be seen in FIGS. 4 and 6, the camera housing may mount at the upper rail or channel 14a of the frame 14 of the window assembly 10, such that the camera housing and lens protrude through an aperture in the appliqué 15a when the channel 14a is attached at the inner surface of the appliqué and fixed window panel. Although shown and described as being disposed at an upper appliqué that is disposed between two spaced apart fixed window panels 15, the window assembly may comprise a hole-in-glass window panel, with an aperture formed through a single fixed window panel, whereby the camera may be disposed along an upper center portion of the fixed window panel.

The camera is thus mounted at and integrated in the rear slider window assembly, and thus may be electrically connected to a wire harness or the like when the window assembly is installed at the vehicle. The window assembly of the present invention thus may include the camera, which may be a rear backup camera or other rearward viewing camera (such as a camera that views rearward and downward into the truck bed, such as for monitoring the truck bed). The camera may be activated responsive to a user input or responsive to the driver of the vehicle shifting the vehicle transmission into reverse gear (whereby images derived from image data captured by the rear backup camera are displayed at the display screen to assist the driver during the reversing maneuver of the vehicle.

Figure 7:
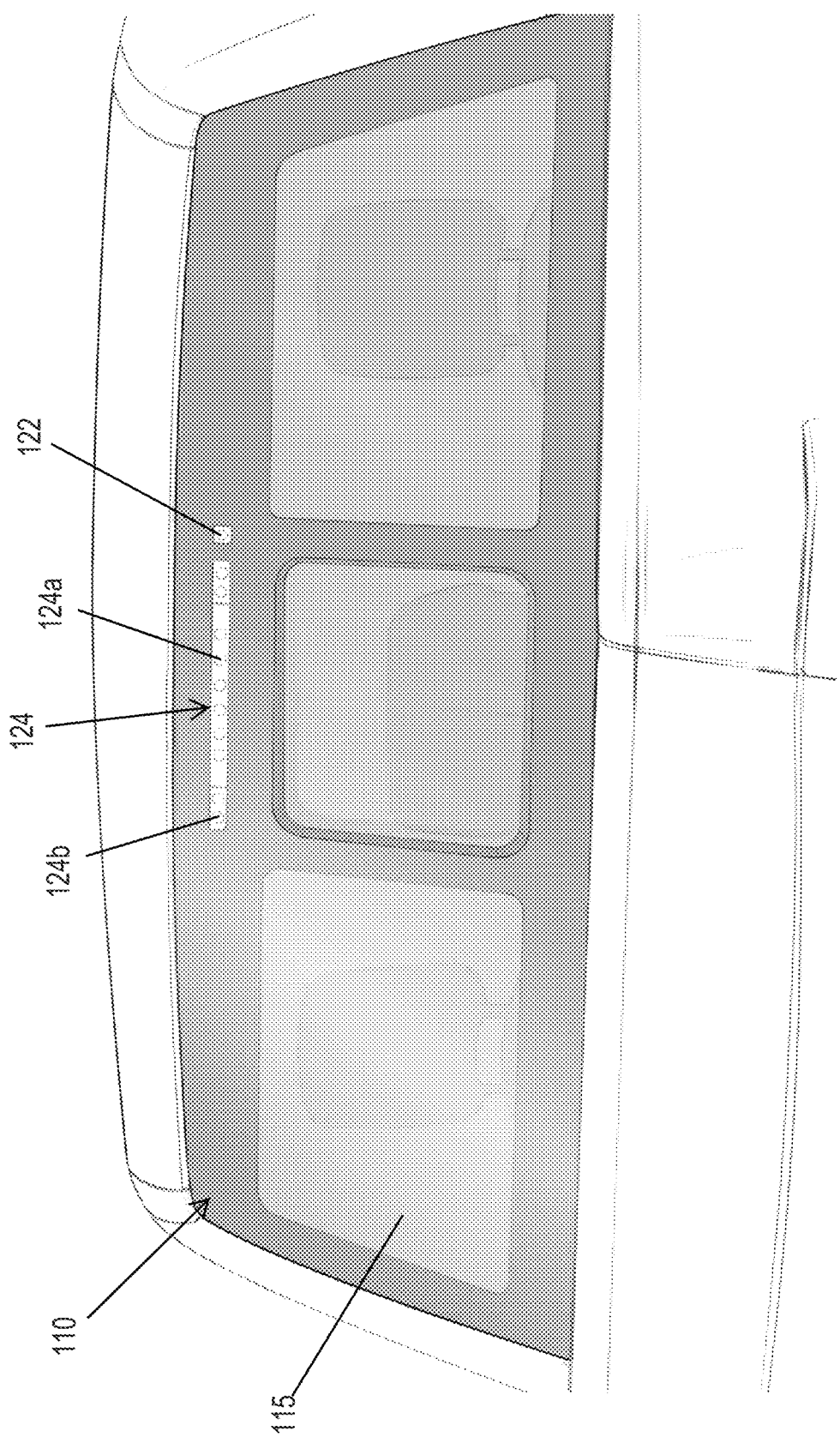
FIG. 7 is a rear elevation of a camera and lighting device of another rear slider window assembly of the present invention.

Optionally, the window assembly may also include an integrated lighting assembly or module, which may be disposed at and behind the fixed glass panel or at an appliqué or the like, so as to emit light through the window panel to provide brake lights and/or to provide rearward illumination, such as to illuminate the truck bed or the like. For example, and such as shown in FIG. 7, a rear slider window assembly 110 includes a single fixed window panel 115 and a movable window panel 120 that opens and closes at an aperture formed through the fixed panel 115. The rear slider window assembly 110 includes a camera module 122 and an illumination module 124 disposed along the inner surface of the fixed window panel above the opening. The illumination module 124 may utilize aspects of the illumination modules described in U.S. Publication No. US-2016-0200241, which is hereby incorporated herein by reference in its entirety. The lighting device or illumination module may comprise a center high mounted stop lamp 124*a* for the vehicle (whereby the lighting system may actuate the lighting device as part of a brake light system of the vehicle) and/or the lighting device may comprise a plurality of white light emitting lights 124*b* whereby the lighting system may actuate the lighting device as part of a truck bed illumination system or the like, as discussed below. The lighting device is disposed behind the glass panel and emits light that passes through the glass panel, such as through a darkened portion of the panel or through apertures or windows formed through a darkened portion of the panel or the like.

In the illustrated embodiment of FIG. 7, the window assembly 110 comprises a hole-in-glass window configuration, where a single fixed glass panel has an aperture or hole or opening established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define an opening therebetween. The fixed window panels may comprise two separate spaced apart fixed window panels that define the opening therebetween (and with upper and lower appliqués or trim or filler panels or elements disposed at the upper and lower regions of the opening and between the fixed window panels, and thus with the lighting device disposed behind the upper appliqué or the like), while remaining within the spirit and scope of the present invention.

In the illustrated embodiment of FIG. 7, the camera 122 is spaced from the lighting device 124, such as toward one side or the other of window assembly from the lighting device. Optionally, the camera may be spaced above or below the lighting device. Optionally, the camera may be disposed at an aperture or hole through the window panel, while the lighting device may be disposed at the inner surface of the window panel so as to emit light through the window panel. Optionally, the camera may comprise a separate module or may be part of the lighting device module.

Figure 8:
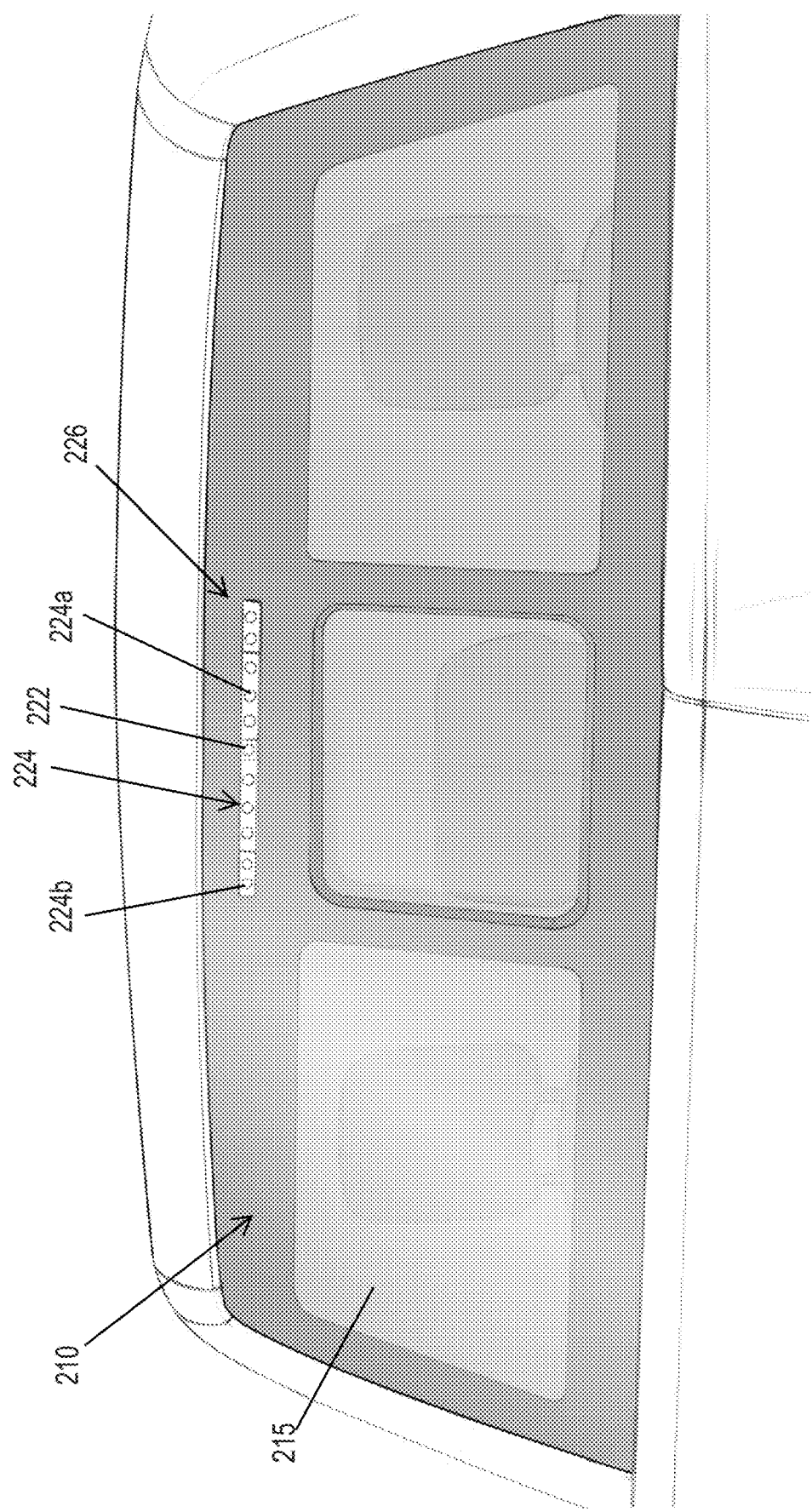
FIG. 8 is a rear elevation of a camera and lighting device of another rear slider window assembly of the present invention.
Figure 9:
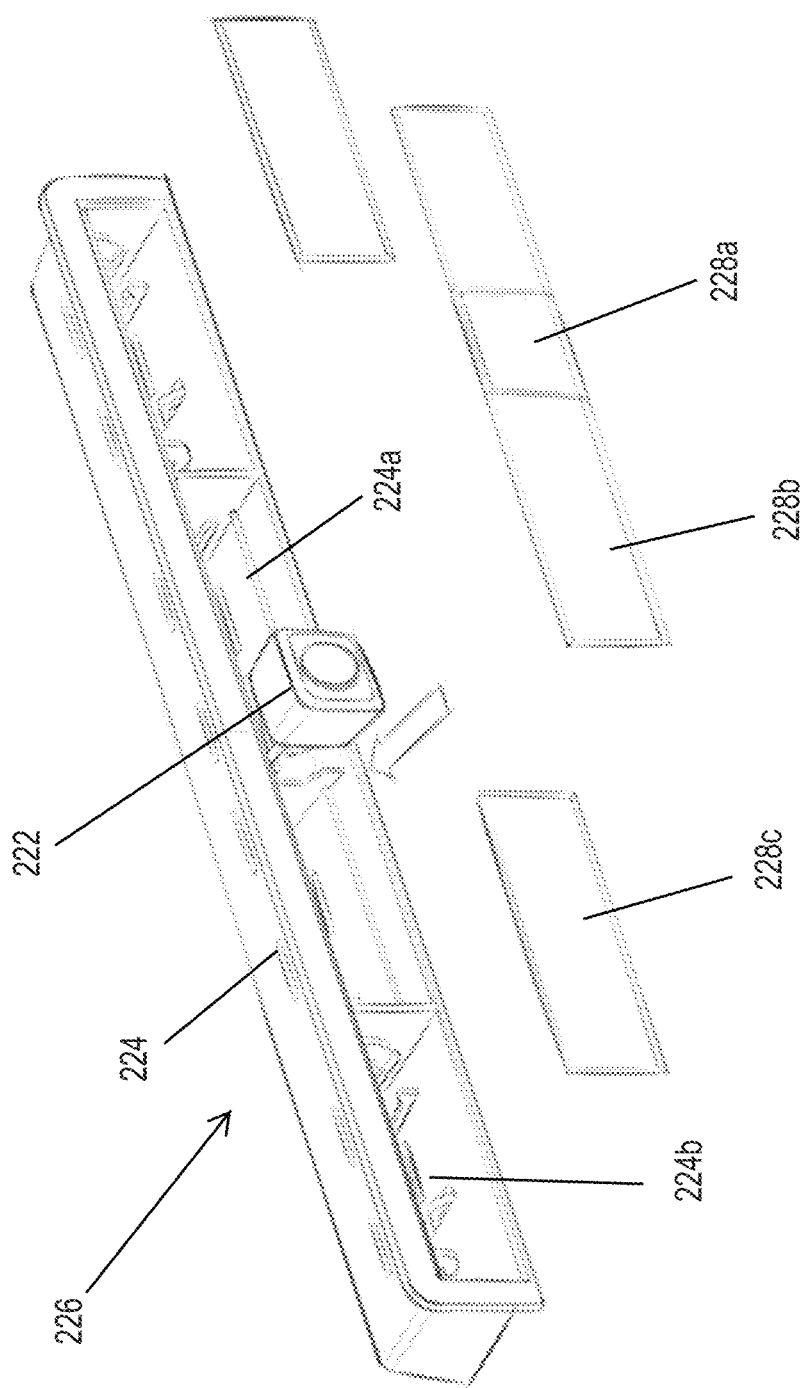
FIG. 9 is an exploded perspective view of the camera and lighting device of FIG. 8.

For example, and with reference to FIGS. 8 and 9, a rear slider window assembly 210 includes a lighting and camera module 226, which includes lighting devices 224 and a camera 222. In the illustrated embodiment, the camera 222 is disposed at a central region of the lighting and camera module 226. The lighting devices 224 may include a plurality of light sources 224*a* (such as red light-emitting LEDs or the like) at a center region of the window assembly (at either side of the camera 222) and a plurality of light sources 224*b* (such as white light-emitting LEDs or the like) at the side regions of the module 226. The lighting device thus may have the center or red light sources electrically connected to the brake light circuitry and the side or white light sources electrically connected to a user input in the cabin of the vehicle or at the window assembly, whereby actuation of the user input actuates the side lights for illuminating the truck bed. The module 226 may include lenses or cover elements that are disposed in front of the camera and light sources, such as to provide a desired color or diffusion. For example, a cover element 228*a* in front of the camera may comprise a transparent or clear element, a cover element 228*b* in front of the center braking lights may comprise a red element, and a cover element 228*c* in front of the side light sources may comprise a white or clear or translucent element.

The module may be attached at the inner surface of the window panel via any suitable means. When attached, the light sources, when energized, emit light through the window panel. The camera may be disposed behind the window panel so as to view through the window (such as through a transparent region of the window panel) or may be disposed at a hole or aperture formed through the window panel.

Figure 10:
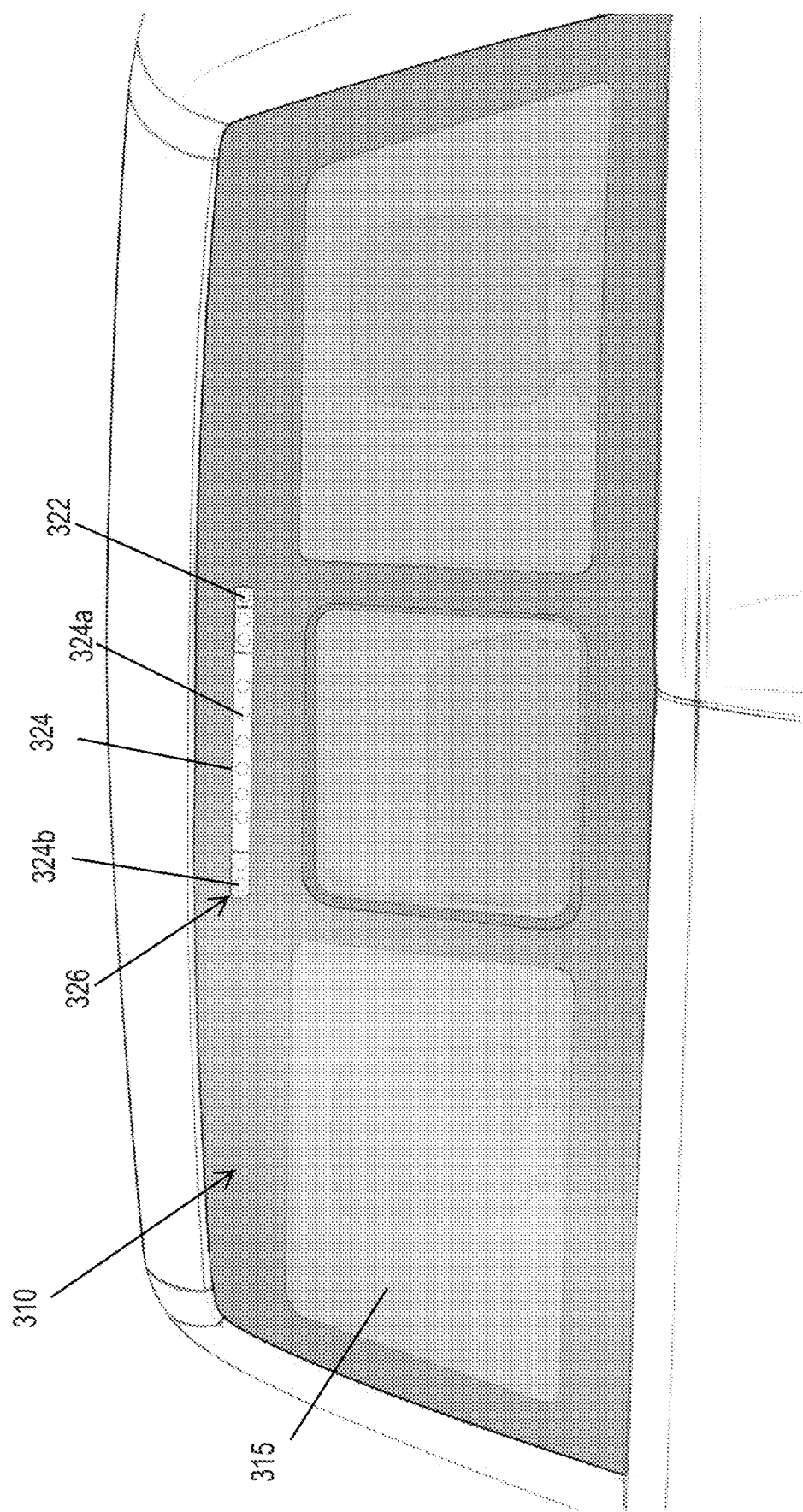
FIG. 10 is a rear elevation of a camera and lighting device of another rear slider window assembly of the present invention.
Figure 11:
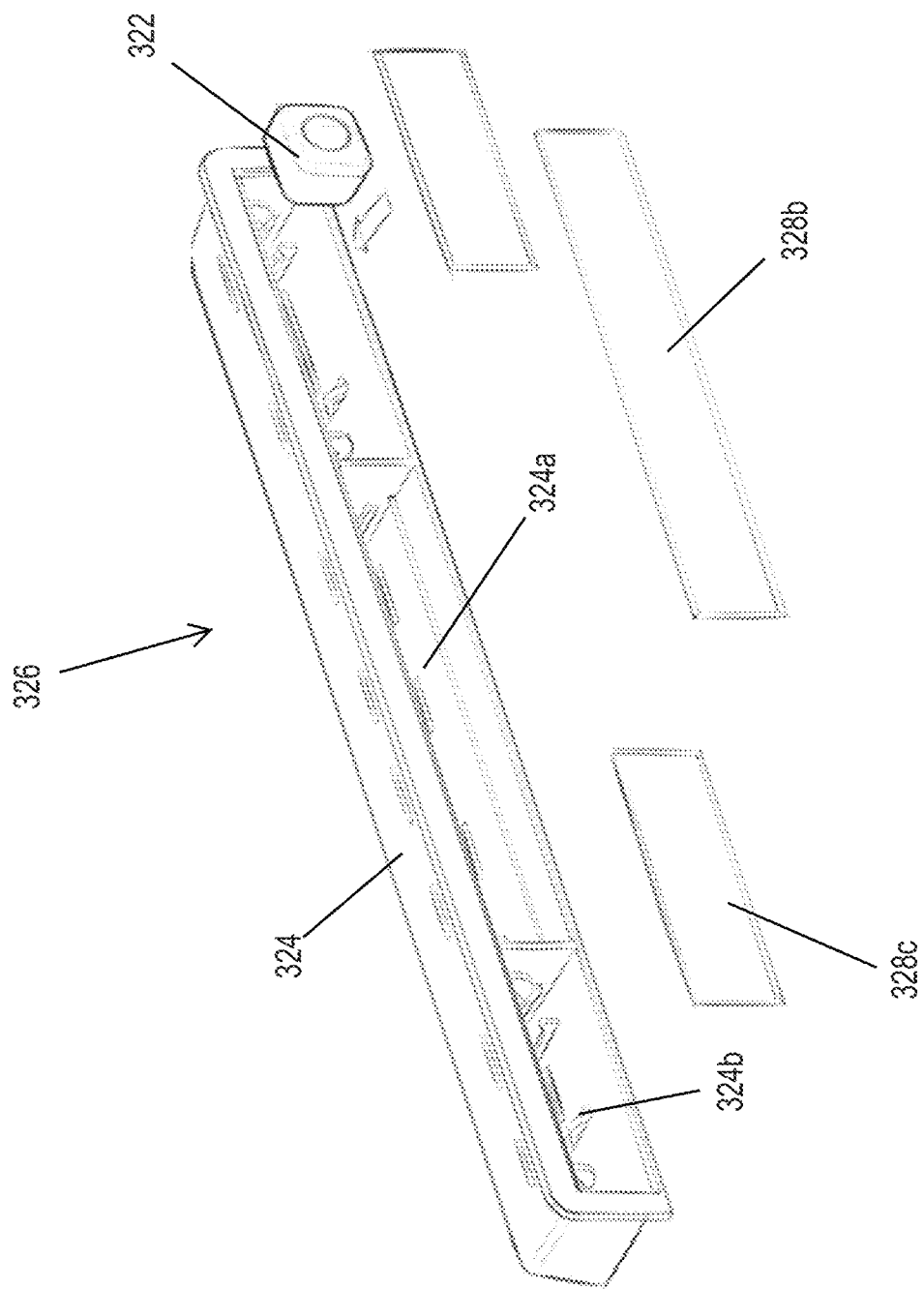
FIG. 11 is an exploded perspective view of the camera and lighting device of FIG. 10.

Optionally, and with reference to FIGS. 10 and 11, a rear slider window assembly 310 includes a lighting and camera module 326, which includes lighting devices 324 and a camera 322, disposed at the fixed window panel 315. In the illustrated embodiment, the camera 322 is disposed at a side region of the lighting and camera module 326. The lighting devices 324 may include a plurality of light sources 324*a* (such as red light-emitting LEDs or the like) at a center region of the window assembly and a plurality of light sources 324*b* (such as white light-emitting LEDs or the like) at the side regions of the module 326. The lighting device thus may have the center or red light sources electrically connected to the brake light circuitry and the side or white light sources electrically connected to a user input in the cabin of the vehicle or at the window assembly, whereby actuation of the user input actuates the side lights for illuminating the truck bed. The module 326 may include lenses or cover elements 328 that are disposed in front of the camera and/or light sources, such as to provide a desired color or diffusion, such as described above. In the illustrated embodiment, there is no cover element in front of the camera, such that the camera may be disposed behind and view through a transparent region of the window panel 315 or may be disposed at a hole or aperture through the window panel.

Figure 12:
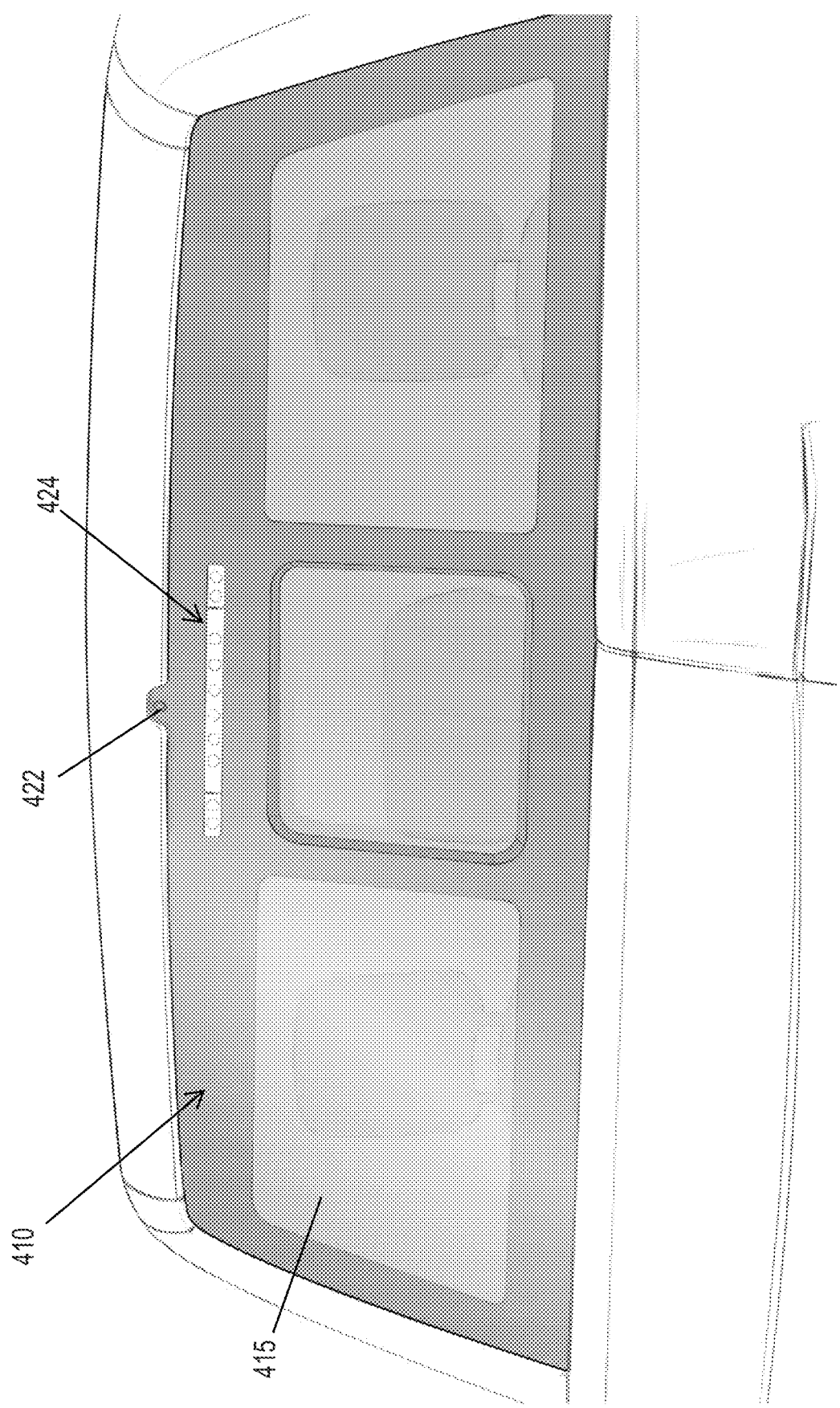
FIG. 12 is a rear elevation of a camera and lighting device of another rear slider window assembly of the present invention.

Optionally, the camera and illumination module or lighting device may comprise separate modules or units that are integrated in the rear slider window assembly. For example, and with reference to FIG. 12, a rear slider window assembly 410 includes a camera module 422, which is disposed at an upper region of the fixed window panel 415, such as at an upwardly protruding portion of the fixed window panel (and the camera may be disposed behind the window panel so as to view through the window panel or may be disposed at a hole or aperture through the window panel, as discussed above). The window assembly 410 includes a lighting device or module 424, which may include a plurality of light sources (such as red light-emitting LEDs or the like) at a center region of the window assembly and a plurality of light sources (such as white light-emitting LEDs or the like) at the side regions of the module, such as described above.

Thus, the camera may be disposed at an inner surface of the fixed panel and above and partially along the upper rail of the rear slider window assembly. The camera (either a camera that is separate from a lighting device or module or a camera that is included with or incorporated in the lighting device or module) includes a housing portion that may be disposed at and adhered to the inner surface of the fixed panel, whereby the camera, when activated, captures image data of the scene rearward of the window assembly, and the light sources, when actuated or energized, emit light through the window panel so as to be viewable to a person viewing the vehicle from behind the vehicle. The housing may be configured to have a flange or portion that attaches or adheres at the inner surface of the window panel and a lower portion that may abut against and along an upper portion of the upper rail or channel. The housing substantially encases the camera (and optionally light sources as well) in a cavity defined at the housing and window panel such that the camera views through the window panel (and light emitted by the light sources passes through the window panel and is not viewable through the housing and inside the vehicle cabin). The light sources may emit sufficient light so as to be viewable through an opaque or semi-opaque layer at the window panel or the light sources may be disposed at and generally aligned with apertures through the opaque or semi-opaque layer at the window panel, such that the light emitted by the light sources of the lighting device passes through the fixed window panel so as to be readily viewable by a person viewing the exterior of the window assembly from exterior and rearward of the vehicle.

The lighting device comprises a strip of a plurality of light sources (such as a plurality of light emitting diodes (LEDs) arranged along a strip or circuit element that extends along and above the aperture of the fixed panel). For example, the light sources may comprise red light-emitting LEDs (or the light sources may be white light-emitting LEDs and the inner surface of the housing and circuit element may be red colored so as to provide red illumination) such that the lighting device comprises a center high mounted stop lamp and is actuated with the brake lights of the vehicle. The light sources may also or otherwise emit light when the camera is activated to illuminate the area encompassed by the field of view of the camera. Optionally, the light sources may include near infrared (NIR) emitting light sources or light emitting diodes (LEDs) and the camera may be sensitive to NIR illumination, such that the light sources may provide illumination for the camera to enhance nighttime operation of the camera.

The camera and light sources of the lighting device may be electrically connected to a wiring harness of the vehicle and/or circuitry of the vehicle (such as a camera control or display device or brake light wiring or circuitry and/or such as a user input and a power source and/or the like) via any suitable means. Optionally, for example, the camera and/or light sources may electrically connect to a connector and electrically conductive trace established at the inner surface of the fixed window panel, whereby a wiring harness or wire of the vehicle may electrically connect to the connector at the window panel. Optionally, the camera and/or light sources may electrically connect to a conductive trace or busbar that extends along the fixed window panel to a connector at a side or lower region of the window assembly, whereby a wiring harness may connect to the connector and to connectors for a heater grid of the window assembly at a common connecting area of the window assembly. Image data captured by the camera may be communicated wirelessly or via a wire that connects to a vehicle wire harness or to a vehicle network bus or the like. Optionally, the camera and/or lighting device may include a wire or lead that extends from the device and that may be routed along or behind the upper rail for electrical connection to a wiring harness or wire of the vehicle. Clearly, other means for electrically connecting the camera and/or light sources to a wiring harness or circuitry of the vehicle may be implemented while remaining within the spirit and scope of the present invention.

The camera and/or lighting device may be bonded at the inner surface of the glass window panel or may be molded as part of the rail or may be attached at the rail. Optionally, the camera and/or lighting device may be attached to one or more brackets bonded or otherwise affixed at the inner surface of the glass window panel.

Thus, the camera and/or lighting device of the present invention are configured to attach directly to the glass window panel (such as via bonding a housing portion at the glass surface or such as via attaching a housing portion to one or more brackets bonded at the glass surface). Optionally, the camera and/or lighting device of the present invention may be disposed above or may be formed as part of an upper channel or rail of a rear slider window assembly, with the rail bonded directly at the glass surface. Optionally, the camera and/or lighting device of the present invention are suitable for direct attachment at the inner surface of a rear window panel for a non-slider window application. Thus, the camera and/or lighting device is not attached to the sheet metal of the vehicle and does not require an impression in the sheet metal. Instead, the camera and/or lighting device is mounted at the inner surface of the glass window panel, and thus is disposed inside the vehicle, whereby the camera and/or lighting device has reduced exposure to the exterior environment, such as to moisture or the like. The fixed window panel may include an opaque or substantially opaque perimeter coating or layer, such as a black frit layer or the like, and the camera may view through an aperture established through the opaque coating while the light sources may emit light that passes through the opaque coating or through apertures established through the opaque coating.

Optionally, although shown and described as having a camera and light sources that are directed through the window panel and thus in a rearward direction with respect to the vehicle, it is envisioned that the window assembly of the present invention may have a module that includes a camera and/or light sources that are directed forwardly and towards and into the interior cabin of the vehicle. For example, the module may include one or more light sources at a separate part of the housing and with an aperture or transparent portion that faces the interior cabin of the vehicle (and that may correspond with an aperture or opening at the headliner of the vehicle), such that light emitted by the one or more light sources may illuminate at least a portion of the interior cabin of the vehicle. Optionally, for example, a camera of the module may view into the cabin of the vehicle, such as for an interior cabin monitoring system of the vehicle.

The movable or slider window panel may be movable such as via manual pushing or pulling at the window panel and preferably is movable in response to actuation of a drive motor of the drive motor assembly or system, which may move cables or wires of cable assemblies relative to the sheath of the cable assemblies to impart horizontal movement of the carrier and slider window panel along the upper and lower rails. Optionally, the drive motor assembly and rail configurations may utilize aspects of the drive assemblies of the types described in U.S. Pat. Nos. 4,920,698; 4,995,195; 5,146,712; 5,531,046; 5,572,376; 6,955,009; 7,073,293 and/or 8,938,914, and/or U.S. Publication Nos. US-2004-0020131 and/or US-2008-0127563, which are all hereby incorporated herein by reference in their entireties.

The benefits of embodiments of the present invention may also be realized in sliding window constructions where an aperture is created in a fixed window panel and where a movable window panel can be made to open or close the aperture. Slider windows of this type are disclosed such as in U.S. Pat. Nos. 8,915,018 and/or 8,881,458, and/or U.S. Publication No. US-2003-0213179 and/or RE41502, which are hereby incorporated herein by reference in their entireties. The benefits of embodiments of the present invention may also be realized in vehicular movable window assemblies other than a rear slider window assembly for a pickup truck or the like, such as (for example) a slider window assembly suitable for use as a movable side window for a vehicle such as a van or a bus.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2006-0107600; US-2008-0127563; US-2004-0020131 and/or US-2003-0213179, and/or International Publication No. WO 2012/148968, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
a frame portion having an upper rail and a lower rail;
at least one fixed window panel that is fixed relative to said frame portion, said at least one fixed window panel defining an opening;
a movable window panel that is movable along said upper rail and said lower rail, wherein said movable window panel is movable between a closed position, where said movable window panel is disposed at said opening, and an opened position, where said movable window panel is disposed at least partially along said at least one fixed window panel; and
a camera mounted at an inner surface of said at least one fixed window panel, wherein, with said slider window assembly installed at a vehicle, said camera operates to capture image data representative of the scene rearward of said slider window assembly.

2. The slider window assembly of claim 1, wherein said camera is disposed at least partially in a hole formed through said at least one fixed window panel so that said camera views rearward of said at least one fixed window panel and not through said at least one fixed window panel.

3. The slider window assembly of claim 1, wherein said camera is disposed behind and views through a light transmissive portion of said at least one fixed window panel.

4. The slider window assembly of claim 1, wherein said camera is disposed at said upper rail.

5. The slider window assembly of claim 1, wherein said camera captures image data responsive to a user input.

6. The slider window assembly of claim 1, wherein, with said slider window assembly installed at the vehicle, said camera captures image data responsive to shifting the vehicle into reverse gear.

7. The slider window assembly of claim 1, wherein said at least one fixed window panel comprises a single fixed window panel having an opening therethrough.

8. The slider window assembly of claim 7, wherein said camera is mounted at said inner surface of said single fixed window panel at a portion of said single fixed window panel that is above said opening.

9. The slider window assembly of claim 1, wherein said camera is adhesively attached at said inner surface of said at least one fixed window panel.

10. The slider window assembly of claim 1, wherein said camera is attached at a mounting element adhesively attached at said inner surface of said at least one fixed window panel.

11. The slider window assembly of claim 1, comprising a lighting device disposed at said inner surface of said at least one fixed window panel, wherein said lighting device emits light that, with said slider window assembly installed at the vehicle, passes through said at least one fixed window panel so as to be viewable by a person viewing said slider window assembly from exterior and rearward of the vehicle.

12. The slider window assembly of claim 11, wherein said camera and said lighting device are part of a single module disposed at said inner surface of said at least one fixed window panel.

13. The slider window assembly of claim 11, wherein said camera is spaced from said lighting device at said inner surface of said at least one fixed window panel.

14. The slider window assembly of claim 11, wherein, with said slider window assembly installed at the vehicle, said lighting device operates as a brake light of the vehicle and, when activated, emits red light through said at least one fixed window panel.

15. The slider window assembly of claim 11, wherein, with said slider window assembly installed at the vehicle, said lighting device operates as an illumination device of the vehicle and, when activated, emits white light through said at least one fixed window panel to illuminate a rear portion of the vehicle.

16. The slider window assembly of claim 11, wherein, with said slider window assembly installed at the vehicle, said lighting device operates as an interior illumination device of the vehicle and, when activated, emits white light to illuminate an interior portion of a cabin of the vehicle.

17. The slider window assembly of claim 16, comprising an interior viewing camera disposed at said inner surface of said at least one fixed window panel, and wherein, with said slider window assembly installed at the vehicle, said interior viewing camera views the interior portion of the cabin of the vehicle.

18. A slider window assembly for a vehicle, said slider window assembly comprising:

a frame portion having an upper rail and a lower rail;

at least one fixed window panel that is fixed relative to said frame portion, said at least one fixed window panel defining an opening;

a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;

an accessory housing disposed at least partially along said upper rail at an inner surface of said at least one fixed window panel;

wherein said accessory housing houses a lighting device that emits light that, with said slider window assembly installed at the vehicle, passes through said at least one fixed window panel so as to be viewable by a person viewing said slider window assembly from exterior and rearward of the vehicle; and wherein said accessory housing houses a camera at said inner surface of said at least one fixed window panel, and wherein, with said slider window assembly installed at the vehicle, said camera operates to capture image data representative of the scene rearward of said slider window assembly.

19. The slider window assembly of claim 18, wherein said camera is disposed at least partially in a hole formed through said at least one fixed window panel so that said camera views rearward of said at least one fixed window panel and not through said at least one fixed window panel.

20. The slider window assembly of claim 18, wherein said camera is disposed behind and views through a light transmissive portion of said at least one fixed window panel.

* * * * *